US011699008B2

(12) United States Patent
Zhao et al.

(10) Patent No.: US 11,699,008 B2
(45) Date of Patent: Jul. 11, 2023

(54) NON-CONFORMAL DOMAIN DECOMPOSITION WITH IMPRINTS AT INTERFACES WITH BOUNDARIES FOR FINITE ELEMENT ANALYSIS

(71) Applicant: ANSYS, INC., Canonsburg, PA (US)

(72) Inventors: Kezhong Zhao, Sewickley, PA (US); Lars Eric Rickard Petersson, Gibsonia, PA (US); Xiaozhou Fu, Pittsburgh, PA (US)

(73) Assignee: ANSYS, INC., Canonsburg, PA (US)

( * ) Notice: Subject to any disclaimer, the term of this patent is extended or adjusted under 35 U.S.C. 154(b) by 150 days.

(21) Appl. No.: 16/549,965

(22) Filed: Aug. 23, 2019

(65) Prior Publication Data

US 2021/0056174 A1    Feb. 25, 2021

(51) Int. Cl.
  *G06F 30/23*      (2020.01)
  *G06T 17/20*      (2006.01)
  *G06F 111/20*     (2020.01)

(52) U.S. Cl.
  CPC .............. *G06F 30/23* (2020.01); *G06T 17/20* (2013.01); *G06F 2111/20* (2020.01)

(58) Field of Classification Search
  CPC ....... G06F 30/23; G06F 2111/20; G06T 17/20
  See application file for complete search history.

(56) References Cited

U.S. PATENT DOCUMENTS

| 7,877,237 | B1 * | 1/2011 | Saebi | G06F 30/13 |
| | | | | 703/1 |
| 8,510,091 | B1 * | 8/2013 | Zhao | G06F 30/23 |
| | | | | 703/13 |
| 10,121,279 | B1 * | 11/2018 | Sundaram | G06T 17/205 |
| 2004/0210425 | A1 * | 10/2004 | Aoki | G06T 17/20 |
| | | | | 703/1 |
| 2007/0188490 | A1 * | 8/2007 | Kanai | G06T 17/20 |
| | | | | 345/423 |
| 2012/0179426 | A1 * | 7/2012 | Fontes | G06F 30/23 |
| | | | | 703/1 |

(Continued)

FOREIGN PATENT DOCUMENTS

| CN | 1386200 A   * | 12/2002 | ............. G06F 30/23 |
| KR | 100805970 B1 * | 2/2008  | ............. G06T 17/20 |

OTHER PUBLICATIONS

Liang Sun, Christopher M Tierney, Cecil G Armstrong, Trevor T Robinson; "Decomposing complex thin-walled CAD models for hexahedral dominant meshing"; Queen's University Belfast Research Portal (Year: 2017).*

(Continued)

*Primary Examiner* — Rehana Perveen
*Assistant Examiner* — Nupur Debnath
(74) *Attorney, Agent, or Firm* — Womble Bond Dickinson (US) LLP

(57) ABSTRACT

A computer aided design can be decomposed into multiple domains or regions in a domain decomposition method, and then one or more finite element method boundary conditions at an interface between the domains can be imprinted on the faces of the domains at the interface, and then mesh generation can be performed independently on the domains. Thus, nonconformal domain decomposition can use the imprinting of the boundary conditions to improve the results of the independent mesh generation.

24 Claims, 8 Drawing Sheets

(56) References Cited

U.S. PATENT DOCUMENTS

| | | | | |
|---|---|---|---|---|
| 2013/0187930 | A1* | 7/2013 | Millman | G06F 30/20 |
| | | | | 345/473 |
| 2015/0051875 | A1* | 2/2015 | Witt | G06F 30/23 |
| | | | | 703/1 |
| 2015/0120261 | A1* | 4/2015 | Giannacopoulos | G06F 30/23 |
| | | | | 703/2 |
| 2015/0161295 | A1* | 6/2015 | Arita | G06F 30/00 |
| | | | | 703/1 |
| 2016/0162617 | A1* | 6/2016 | Fontes | G06F 30/23 |
| | | | | 703/1 |
| 2016/0321384 | A1* | 11/2016 | Pal | B33Y 50/02 |
| 2017/0206288 | A1* | 7/2017 | Gordon | G06F 17/13 |

OTHER PUBLICATIONS

Yoseph Bar-Cohen; book "Advances in Manufacturing and Processing of Materials and Structures" (Year: 2018).*

P. Laug,, H. Borouchaki; "Discrete CAD model for visualization and meshing" 25th International Meshing Roundtable (IMR25); Procedia Engineering (Year: 2016).*

Muhammad A. Awad, Ahmad A. Rushdi, Misarah A. Abbas, Scott A. Mitchell, Ahmed H. Mahmoud, Chandrajit L. Bajaj, Mohamed S. Ebeida; "All-Hex Meshing of Multiple-Region Domains without Cleanup"; 25th International Meshing Roundtable (IMR25); Procedia Engineering (Year: 2016).*

Kezhong Zhao et al; "Efficient Full-Wave Electromagnetic Simulation with Hybrid Finite Element—Boundary Integral"; Proceedings of the 41st European Microwave Conference (Year: 2011).*

Kezhong Zhao et al; "A Domain Decomposition Method With Nonconformal Meshes for Finite Periodic and Semi-Periodic Structures"; IEEE Transactions On Antennas and Propagation, vol. 55, No. 9, Sep. 2007 (Year: 2007).*

Atul Thakur et al; "A Survey of CAD Model Simplification Techniques for Physics-based Simulation Applications"; Article in Computer-Aided Design • Feb. 2009 (Year: 2009).*

Marinos Vouvakis et al.; "A domain decomposition approach for non-conformal couplings between finite and boundary elements for unbounded electromagnetic problems in R3"; Journal of Computational Physics 225 (2007) 975-994 (Year: 2007).*

ANSYS Meshing User's Guide (released in Nov. 2010) (Year: 2010).*

Marinos N. Vouvakis et al.; "Finite-Element Analysis of Infinite Periodic Structures With Nonmatching Triangulations"; IEEE Transactions On Magnetics, vol. 42, No. 4, Apr. 2006 (Year: 2006).*

David R. White et al.; "The Meshing Complexity of a Solid: an Introduction"; (Year: 2015).*

* cited by examiner

Note that physically there will be no gap.

NON-CONFORMAL DOMAIN DECOMPOSITION WITH IMPRINTS AT INTERFACES WITH BOUNDARIES FOR FINITE ELEMENT ANALYSIS

BACKGROUND

This disclosure relates to methods and systems that use finite element analysis to represent or simulate physical systems. In particular, this disclosure is related to computer aided design for generating a mesh assembly for simulating a physical system or structure using, for example finite element analysis.

The demand for simulation of physical systems of all types continues to grow, especially in areas of product development and design. Because physical production of prototypes for testing is time-consuming and often expensive, simulation, particularly simulation performed by computer systems, can provide a valuable tool that streamlines research and development to a narrow set of possible solutions to a problem prior to expensive physical testing.

The simulation of physical systems often employs a mesh which is used in a finite element method to provide outputs for the simulation. A mesh includes elements that are typically simple shapes such as tetrahedrons, hexahedrons, prisms, and other volumetric (three dimensional—3D) shapes. These simple shapes have faces, edges, and vertices. A mesh includes a collection of these elements, which can be referred to as mesh elements, and a mathematical description of the relationship between the nodes, edges, and faces of the mesh elements. In a numerical analysis of physical systems, complicated three-dimensional shapes may be broken down to (i.e., approximated by) a mesh representation. The mesh representation may subsequently be used in setting up and solving equations for finite element analysis or a finite element method which may include numerical solution of partial differential equations based on boundary conditions. Other analysis methods can be used in other examples. Mesh-based analysis techniques are used widely in the fields of computational fluid dynamics (CFD), aerodynamics, electromagnetic fields, civil engineering, chemical engineering, naval architecture and other fields of engineering as well as manufacturing and fabrication processes, such as additive manufacturing processes.

SUMMARY

This disclosure describes computer aided design methods, systems, and non-transitory machine readable media that can generate mesh assemblies over a structure represented in a design that has non-conformal domains or regions. These mesh assemblies can then be used in finite element analysis methods that provide computer generated models of the structure, and these models can be used to evaluate and improve the design of the structure. The non-conformal domains can be created manually or automatically to subdivide the structure into the non-conformal domains, and a mesh assembly or mesh generation process can be performed independently for each of the domains after applying one or more constraints based on boundaries. In other words, a mesh is generated for each region independently of, and without regard to, the mesh generation process for other regions after one or more constraints are applied to a face of a region that interfaces with one or more faces of one or more other regions. Thus, the mesh generation process is constrained by these constraints that are applied before the mesh generation process begins. The constraints in one embodiment are finite element method boundary conditions that specify boundary conditions being represented in the computer-generated model or simulation. The constraints can be imprinted from one face on one region to another face on an adjacent region at the interface between the regions.

A method according to one embodiment can include the following operations: determining a plurality of regions in a representation of a structure, the plurality of regions including a first region and a second region; determining that a first face of the first region is adjacent to a second face of the second region at an interface between the first face and the second face; determining that the first face includes a representation of an applied first finite element method (FEM) boundary condition that is not present in the second face; adding (e.g., imprinting), in response to determining that the first FEM boundary condition is not present in the second face, the first FEM boundary condition to the second face at a position on the second face corresponding to a position of the representation of the first FEM boundary condition on the first face; and generating meshes for use in a finite element method, the generation of the meshes constrained on the second face by the first FEM boundary condition added to the second face. In one embodiment the method can further include the operations of: determining that the second face includes a representation of an applied second FEM boundary condition that is not present on the first face; adding (e.g., imprinting), in response to determining that the second FEM boundary condition is not present on the first face, the second FEM boundary condition to the first face at a position on the first face corresponding to a position of the representation of the second FEM boundary condition on the second face; and wherein the generation of meshes is constrained on the first face by the second FEM boundary condition added to the first face; and wherein the generation of meshes on the first face is performed independently of the generation of meshes on the second face. In one embodiment, the method can further include the operation of: computing one or more physical properties of the structure based on the generated meshes, wherein the one or more physical properties are computed based on boundary conditions specified relative to one or more locations in the generated meshes and wherein the one or more physical properties include properties relating to, for example, electromagnetic fields.

In one embodiment, each region, in the plurality of regions is a domain that is created as part of a domain decomposition method and wherein the decomposition of domains and subsequent mesh generation is non-conformal. In one embodiment, the plurality of regions can be determined either manually or automatically, and the plurality of regions are non-overlapping and wherein the adding is done through imprint sheets that can be transformed when processing copied regions (e.g., see FIG. 6). In one embodiment, the representation (of the structure being designed) that is used in the method is contained in a digital file that is used in a computer aided design process of the structure, and the computer aided design process produces an output that is used to fabricate the structure. In one embodiment, at the interface between the first face and the second face, the first face is in contact with the second face but is not overlapping. In one embodiment, the one or more boundary conditions which are added or imprinted can be one or more of: (1) a boundary condition obtained from material properties (or other properties) of an object that is not meshed (e.g., no mesh will be generated) inside of the object and instead is represented by the first FEM boundary condition on the object's surface; (2) a boundary condition used to represent a physical feature or property or characteristic on the face such as the first face; (3) a boundary condition defined by a designer in the computer aided design process. In one embodiment, the boundary condition constrains the generation of the meshes by requiring that all mesh elements inside a perimeter of the representation of the applied first FEM boundary condition be wholly contained within the perimeter and no mesh element related to a boundary condition extends across the perimeter and no mesh element outside of the perimeter extends across the perimeter. In one embodiment, each region can include a plurality of tetrahedra which includes a tetrahedron that includes a face that is a surface of the tetrahedron and the mesh elements on the faces of the tetrahedrons am triangles.

The aspects and embodiments described herein can include non-transitory machine readable media that store executable computer program instructions that when executed can cause one more data processing systems to perform the methods described herein when the computer program instructions are executed by the one or more data processing systems. The instructions can be stored in non-volatile memory such as flash memory or dynamic random access memory which is volatile or other forms of memory.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Various embodiments described herein relate to domain decomposition based finite element methods that can be used in, for example, computer aided design processes. For example, the simulation of electromagnetic fields in user-defined domains can be performed using one or more embodiments described herein. Electromagnetic simulations of complicated designs frequently run into problems when the simulation system attempts to generate meshes for the finite element methods. The generation of meshes across multiple domains can either take a very long time to get the mesh generated or the mesh generation process fails, and thus no mesh is produced, due to either extreme multiple scale issues in which there are multiple scales in the design or due to complex or "dirty" geometries. The embodiments described herein can be combined with mesh strategies to handle complex or "dirty" geometries, and the embodiments described herein can aid in the simplification and acceleration in time of the mesh generation process for large designs with or without multiple scale issues. U.S. Pat. No. 8,510,091 describes an example in the prior art of domain decomposition formulations which can be used to simulate electromagnetic fields, and this US patent is hereby incorporated herein by reference.

Figure 1A:
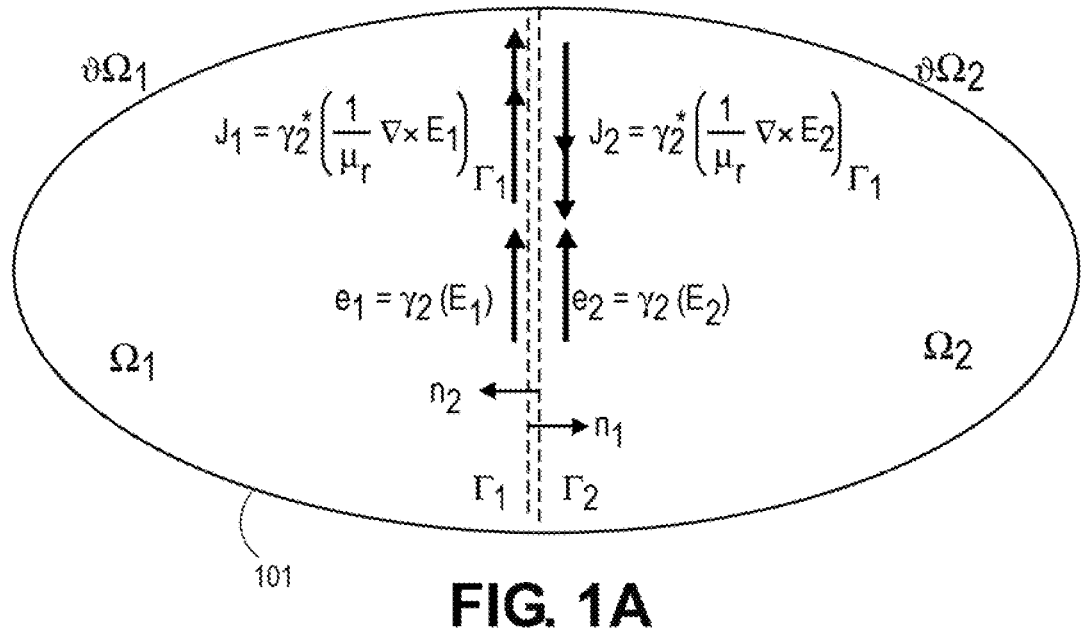
FIG. 1A shows an example of a model of a structure which is to be decomposed into a plurality of domains or regions.
Figure 1B:
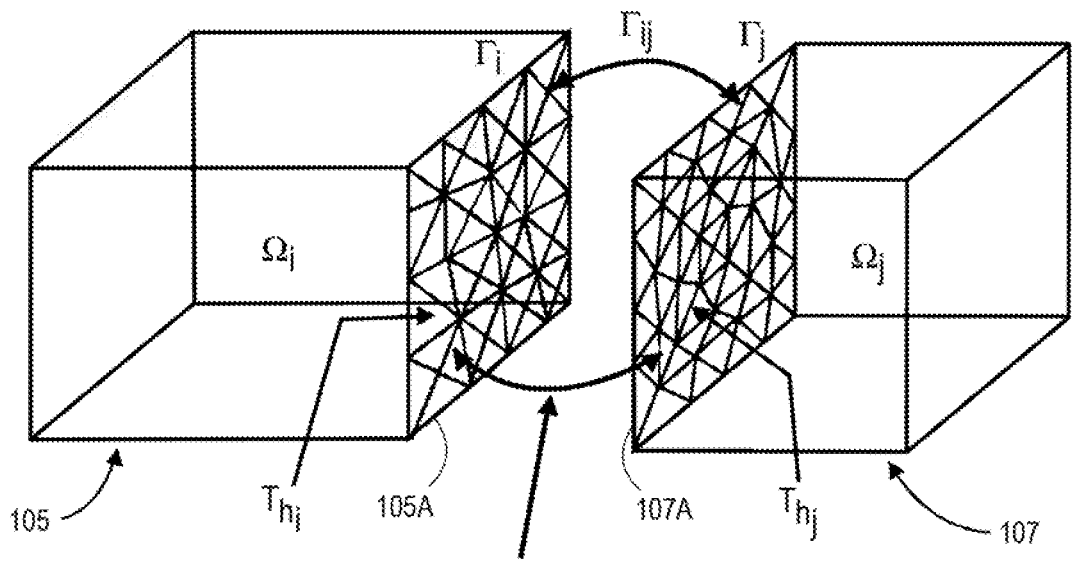
FIG. 1B shows the structure of FIG. 1A after it has been decomposed into two domains or regions and after the two adjacent faces have been processed to generate meshes on each of the faces.

An example of decomposition of a structure into domains will now be provided while referring to FIGS. 1A and 1B. FIG. 1A shows an example of a structure 101 which will be decomposed into at least two domains or regions in order to perform finite element methods on the structure 101 through the use of meshes generated separately for each of the domains that result from the decomposition of the structure 101. Details regarding the structure 101 shown in FIG. 1A can be found in U.S. Pat. No. 8,510,091. FIG. 1B shows the structure 101 after it has been decomposed into at least two domains shown as domain 105 and domain 107. The two domains 105 and 107 are in physical contact but do not overlap such that the face 105A is in contact with the face 107A at the interface between domain 105 and domain 107. The gap between domain 105 and domain 107 in FIG. 1B is shown for purposes of allowing the illustration of the meshes on faces 105A and 105B. FIG. 1B shows that meshes have been generated on each of the faces 105A and 107A and that these meshes are not identical and hence the decomposition and the meshing process have produced non-conformal domains. The embodiments described herein can create non-overlapping and non-conformal domains that are created by decomposing a structure into the multiple domains.

Figure 2A:
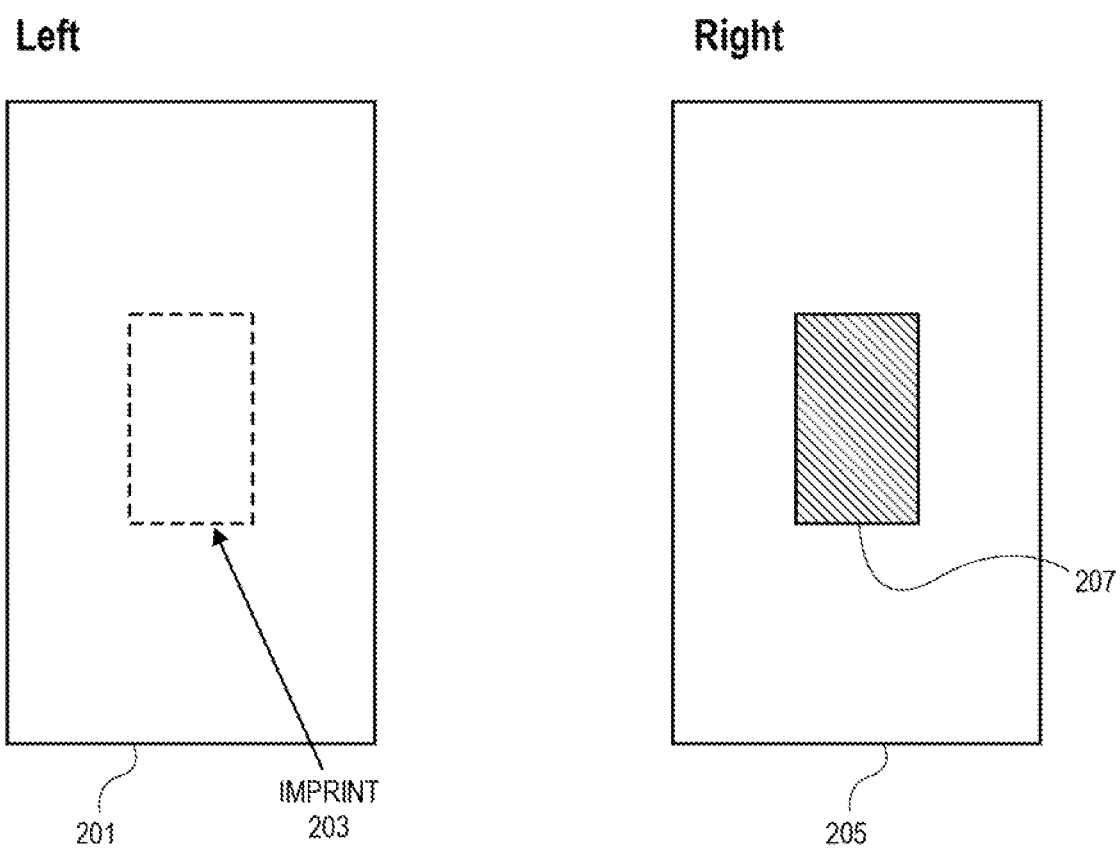
FIG. 2A shows an example of adjacent faces between two domains.
Figure 2B:
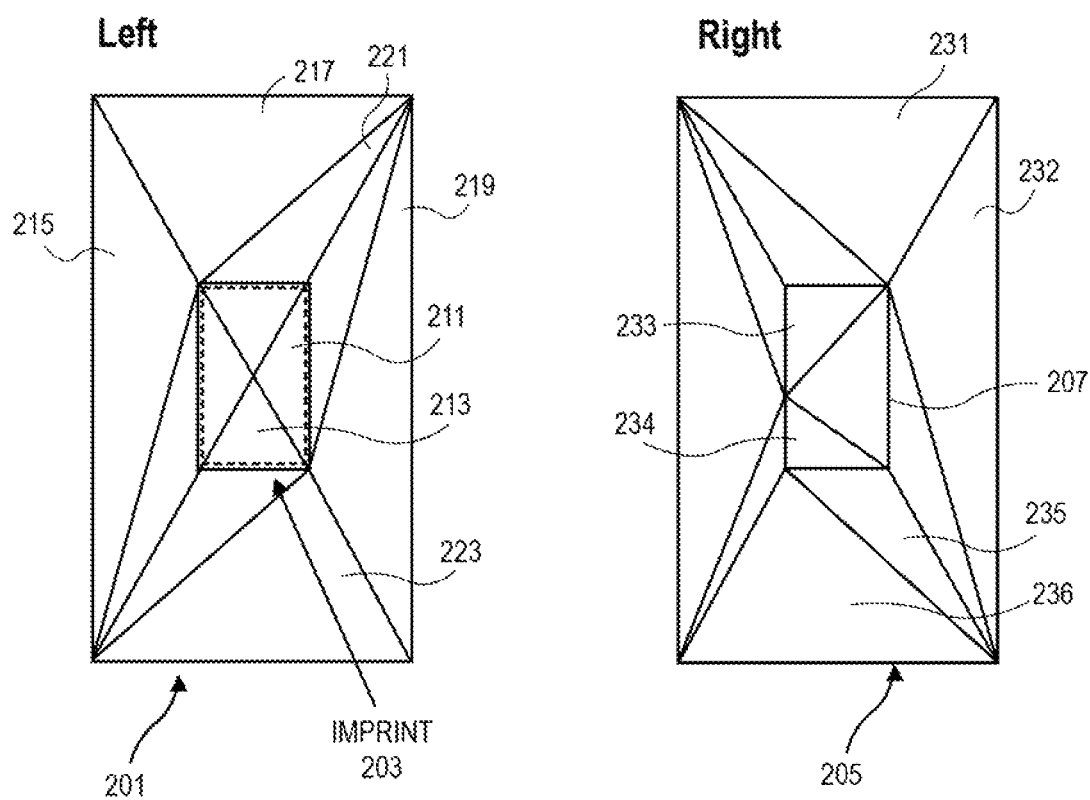
FIG. 2B shows the two domains of FIG. 2A after a boundary condition from the right domain has been added or imprinted on the face of the left domain and after both faces have been processed to generate a mesh pattern on each face.

Once multiple domains have been created, the embodiments described herein can determine whether one or more conformal constraints or boundary conditions should be added on adjacent faces at each interface between domains, and this is shown in FIGS. 2A and 2B. FIG. 2A shows an aspect of the embodiments in which a boundary condition, represented by representation 207, that is present on one side or face of an interface is added or imprinted on the other side or face of the interface before beginning a mesh generation process. The interface exists between two adjacent non-overlapping regions or domains that have been generated as a result of the domain decomposition method. The face 201 can be a face on a left domain (a three dimensional volume) and the face 205 can be a face on a right domain (a three dimensional volume) which is adjacent to and in contact with the left domain. For example, the face 201 shown in FIG. 2A can be the face 105A shown in FIG. 1B, and the face 205 shown in FIG. 2A can be the face 107A shown in FIG. 1B. The face 205 includes a representation 207 of a boundary condition, and this representation 207 is not present on the face 201 when the domain or region that includes the face 201 is created. The representation 207 can define the perimeter of an internal object or feature that has an FEM boundary condition that is represented on the face 205 by the representation 207. This FEM boundary condition is a boundary condition (e.g., those boundary conditions used in solving partial differential equations or other equations by a computerized solver) that is enforced in finite element methods and can be obtained from the properties (e.g. material properties or physical characteristics) of the internal object or feature that is not itself meshed and instead is represented by an applied boundary condition on the face 205, and this applied boundary condition is represented on the face 205 by the representation 207. The internal object or feature can be contained within the three dimensional volume of the domain that includes the face 205 as one of the surfaces of that three dimensional volume. The FEM boundary condition from that internal object or feature is applied onto the face 205 by the representation 207. In one embodiment, the FEM boundary condition can be used to represent a physical feature or physical property or physical characteristic on the face 205. According to the embodiments described herein, the representation 207 can be added or imprinted onto the face 201 before beginning a mesh generation process to create an imprinted boundary condition. The added or imprinted boundary condition, such as imprint 203, is used to constrain meshing when the mesh generation process generates meshes for the face 201 which is the face on a first domain, while the face 205 is a face on a second domain.

FIG. 2B shows how the mesh generation process uses the constraints provided by imprint 203 to constrain the generation of meshes such that all mesh components within the imprint 203 are contained within the interior of the imprint 203 and do not cross the perimeter of the imprint 203, and similarly, meshes outside of the perimeter of the imprint 203 do not cross the perimeter of the imprint 203 as shown in FIG. 2B. Thus, the imprint 203 constrains the mesh generation process such that the individual meshes will not cross the boundary condition which was added or imprinted from one face onto another face. As shown in FIG. 2B, the triangles (representing individual mesh elements) outside of the imprint 203, such as triangles 215, 217, 219, 221, and 223, do not cross or extend into the imprint 203. Similarly, the triangles within the imprint 203, such as triangles 211 and 213, are constrained within the imprint 203 and do not cross the perimeter of the imprint 203. The representation 207 on the right side of the interface constrains the generation of meshes within the representation 207 and also outside of the representation 207 as shown in FIG. 2B. For example, the triangles within the representation 207, including triangles 233 and 234, do not cross the perimeter of the representation 207. Similarly, the triangles outside of the representation 207, such as triangles 231, 232, 235, and 236 do not cross the perimeter of the representation 207. It will be appreciated that each of the triangles represents one of the mesh elements created in the meshing process which can then be used to perform finite element methods using the meshes generated by the meshing process. In one embodiment, the meshing process or mesh generation process can use conventional and known mesh generation algorithms and methods to generate the meshes after the imprinting or adding of one or more boundary conditions from one side to the other side of an interface as described herein. A specific method of the use of an embodiment will now be provided with reference to FIG. 3 which relates to the use of an embodiment for electromagnetic designs.

Figure 3:
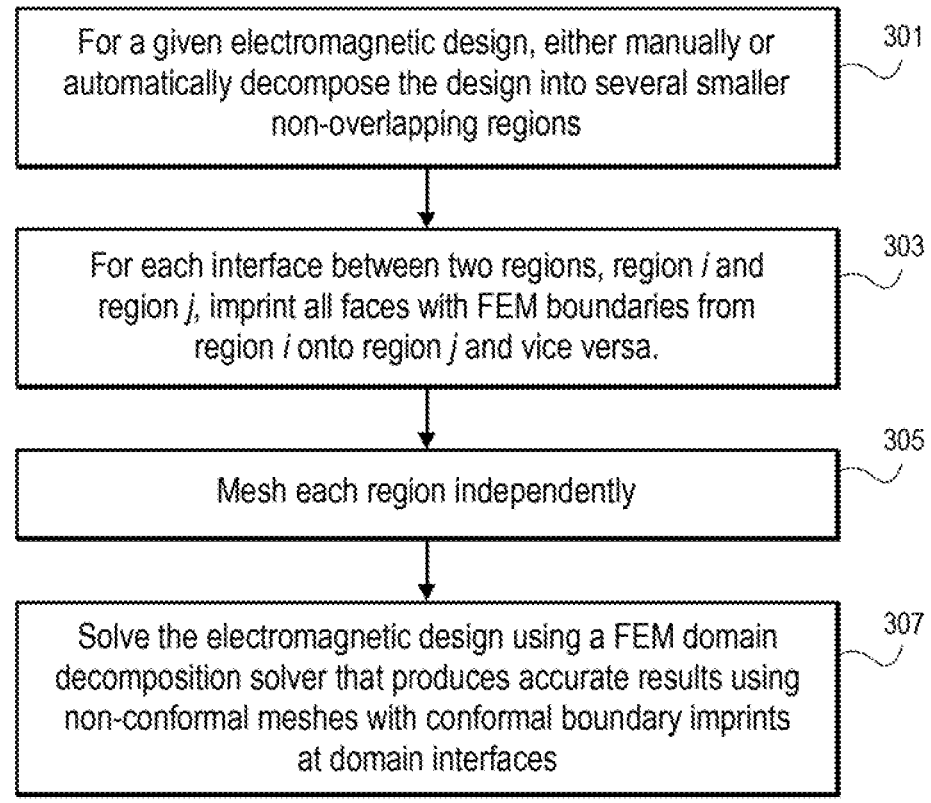
FIG. 3 is a flowchart which illustrates a particular embodiment which can be employed for electromagnetic designs.

At least some of the embodiments can be used to design electronic products. FIG. 3 shows an example of a method which can be used according to one embodiment to design or simulate electrical systems. In operation 301, a design, which can be a tablet computer or a smart phone or other consumer electronic products, can be decomposed into several smaller non-overlapping regions or domains. Then in operation 303, an embodiment imprints finite element method boundary conditions from one region onto another region if, at an interface between two regions, the finite element boundary condition (indicated by a representation) is present on only one face of the two regions at the interface. Thus, for each interface between two regions, such as region i and region j, an embodiment will imprint or add all faces with such finite element method boundary conditions from region i to region j and vice versa. The imprinting or adding can be similar to the imprint 203 shown in FIG. 2A in which the representation 207 from the right region or domain is added or imprinted onto the face 201 on the left region or domain, where the left region did not include the representation 207 prior to the adding or imprinting. After operation 303, conventional meshing algorithms can be used to mesh each region independently in operation 305 shown in FIG. 3. An example of such meshing algorithms can be found in U.S. Pat. No. 10,121,279. Then, in operation 307, the simulation system can solve the electromagnetic design using a finite element domain decomposition solver that produces accurate results using non-conformal meshes with the conformal boundary condition imprints at the domain interfaces. The operation 307 can use conventional methods and algorithms to produce the results such as the methods and algorithms described in U.S. Pat. No. 10,210,290.

Figure 4:
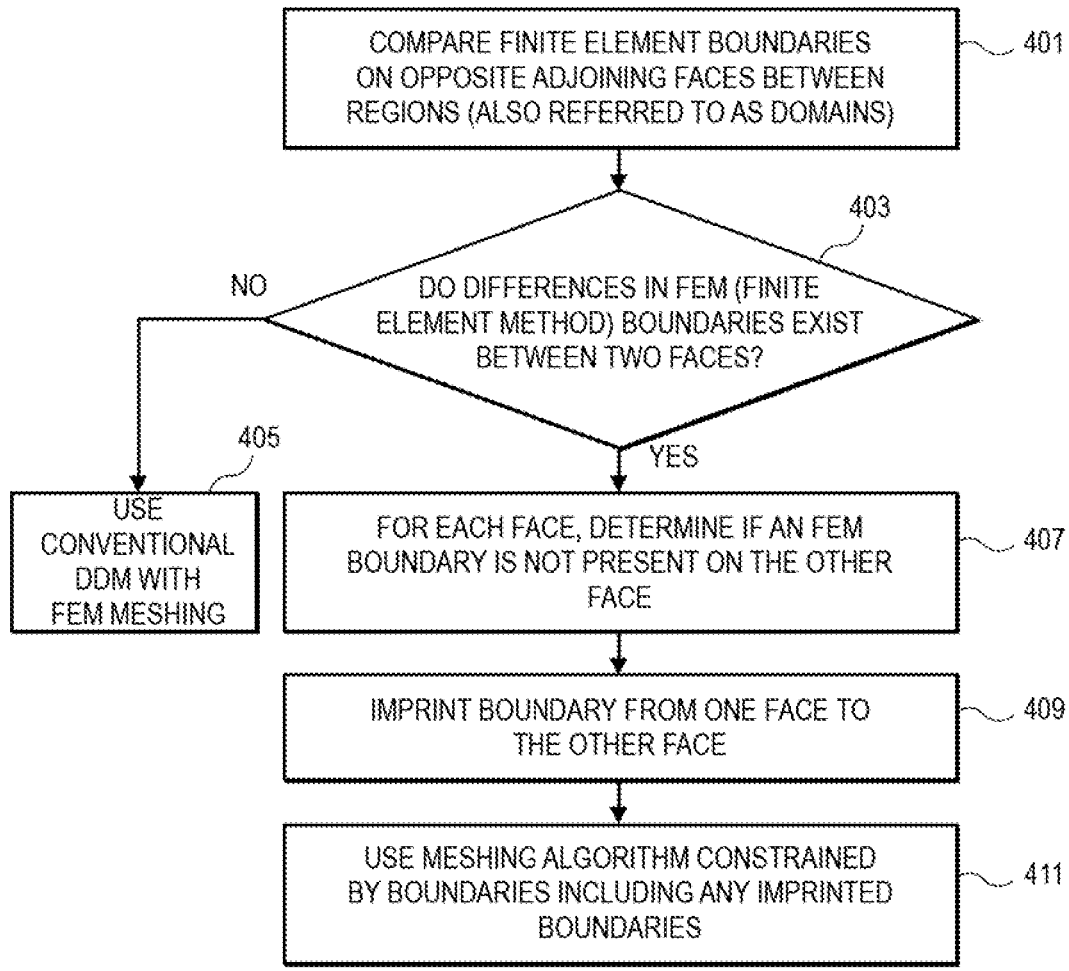
FIG. 4 is a flowchart which illustrates a general embodiment which can be employed for various different types of physical systems.

An example of a method which can be used to implement operation 303 in FIG. 3 will now be provided while referring to FIG. 4. The method shown in FIG. 4 is a general example of how interfaces between non-overlapping, nonconformal domains can be processed to add constraints which can then be applied to constrain meshing algorithms relative to one or more imprinted boundary conditions which have been created by the method shown in FIG. 4. The method of FIG. 4 can be used in various different types of physical solvers such as electromagnetic solvers, computational fluid dynamics solvers, solvers for additive manufacturing, etc. In operation 401, a simulation system can compare applied finite element boundary conditions on opposite adjoining faces at an interface between regions. This comparison can determine, in step 403, whether differences in finite element method boundary conditions exist between each such face. If no differences exist, then processing can proceed to operation 405, in which conventional domain decomposition methods with finite element meshing can be used. On the other hand, if differences do exist, then processing proceeds to operation 407. In operation 407, for each face, the system determines if a finite element method boundary condition is not present on the other face. If it is not present, then the boundary condition from one face is imprinted or added to the other face in operation 409. FIGS. 2A and 2B show an example of how a boundary condition, in this case, a boundary condition represented by representation 207, is imprinted on the other face to create an imprint boundary condition which is shown as the imprint 203 in FIGS. 2A and 2B. In operation 411, the system can use conventional meshing algorithms to generate meshes, where the algorithms are constrained by the imprinted or added boundaries.

Figure 5:
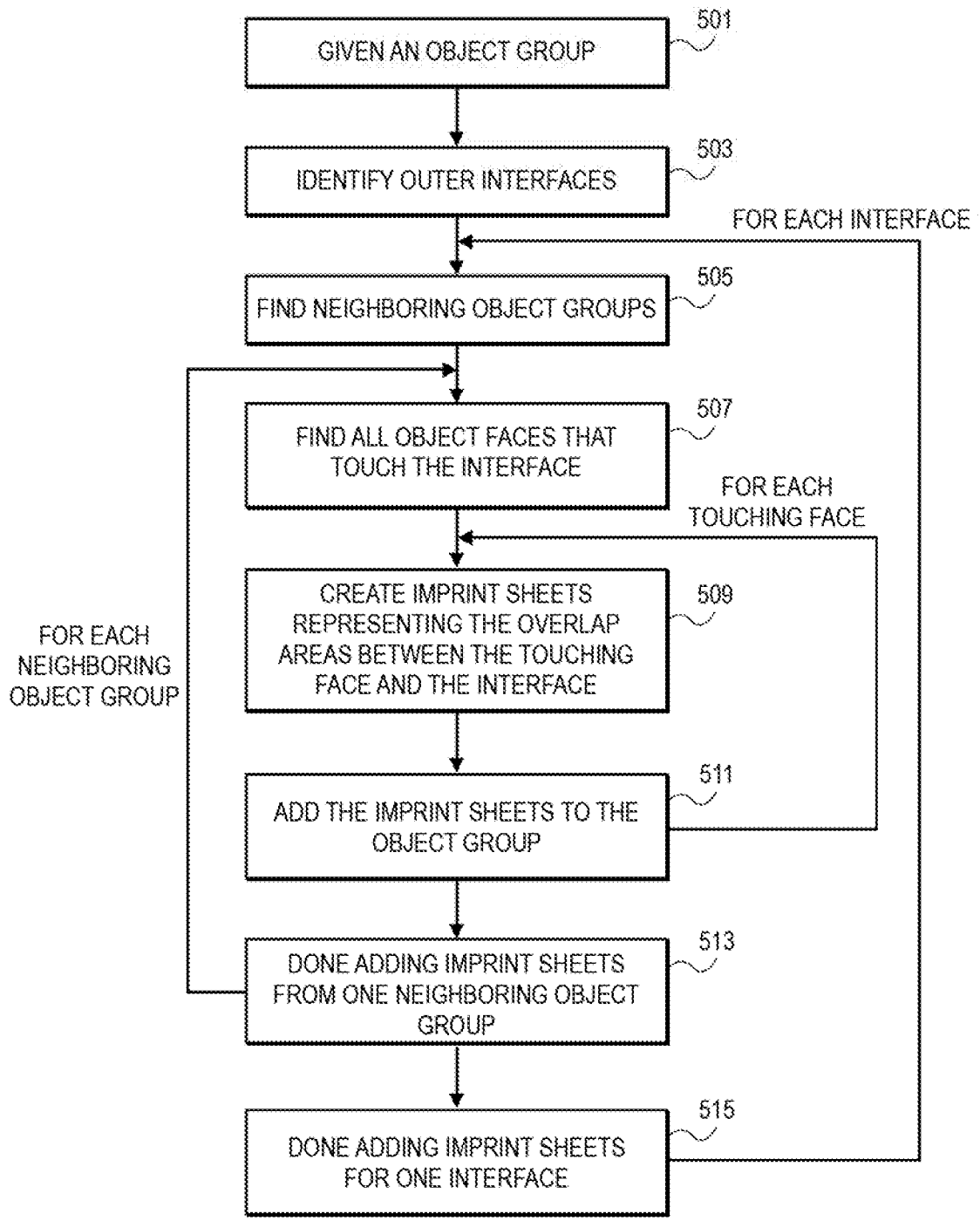
FIG. 5 shows an example of a method according to one embodiment which may be performed by using imprint sheets.

FIG. 5 shows a method which provides a specific example that uses imprint sheets to generate the imprint boundary condition at the interface between domains or regions. In the example shown in FIG. 5, the phrase "object group" is used and is the same as a region or domain in this description. In operation 501, the system starts with a given specific domain or object group. In operation 503, the system identifies all of the outer interfaces of the given domain or object group. In operation 505, the system identifies all neighboring object groups which are in contact with the given object group or domain. Then in operation 507 the system finds all object faces that touch the interface for the given object group or domain. Then in operation 509, the system creates imprint sheets representing the overlap areas between the touching face and the interface, and then in operation 511, the system adds the imprint sheets to the object group. An imprint sheet can contain imprints for boundary conditions. In operation 513, the system determines whether it is done adding imprint sheets from one neighboring object group. For each touching face, operations 509 and 51 are repeated as shown in FIG. 5. Similarly, for each neighboring object group, operations 507, 509, 511, and 513 are repeated. In operation 515, the system determines whether it has completed adding imprint sheets for one interface. For each interface, operations 505, 507, 509, 511, 513 and 515 are repeated until all imprints have been added at all interfaces for a given domain or object group. The method shown in FIG. 5 is repeated for each domain or object group. An object group can be defined to be a group of objects that form a connected region or domain and are mashed together, meaning that a mesh assembly or mesh pattern is generated for the domain. Domains can be in contact but they cannot intersect with each other in one embodiment. The outer interfaces of an object group are defined as the outermost surfaces of the connected region which defines the domain or region that can contact the outer interfaces of other domains or object groups. When two contacting domains or object groups are meshed independently their outer interfaces will have the nonconformal triangulations as described herein. In order to make the meshes imprint with conformal boundary conditions, each object group is extended to include contacting faces from its neighbors before the mesh is generated.

Figure 6:
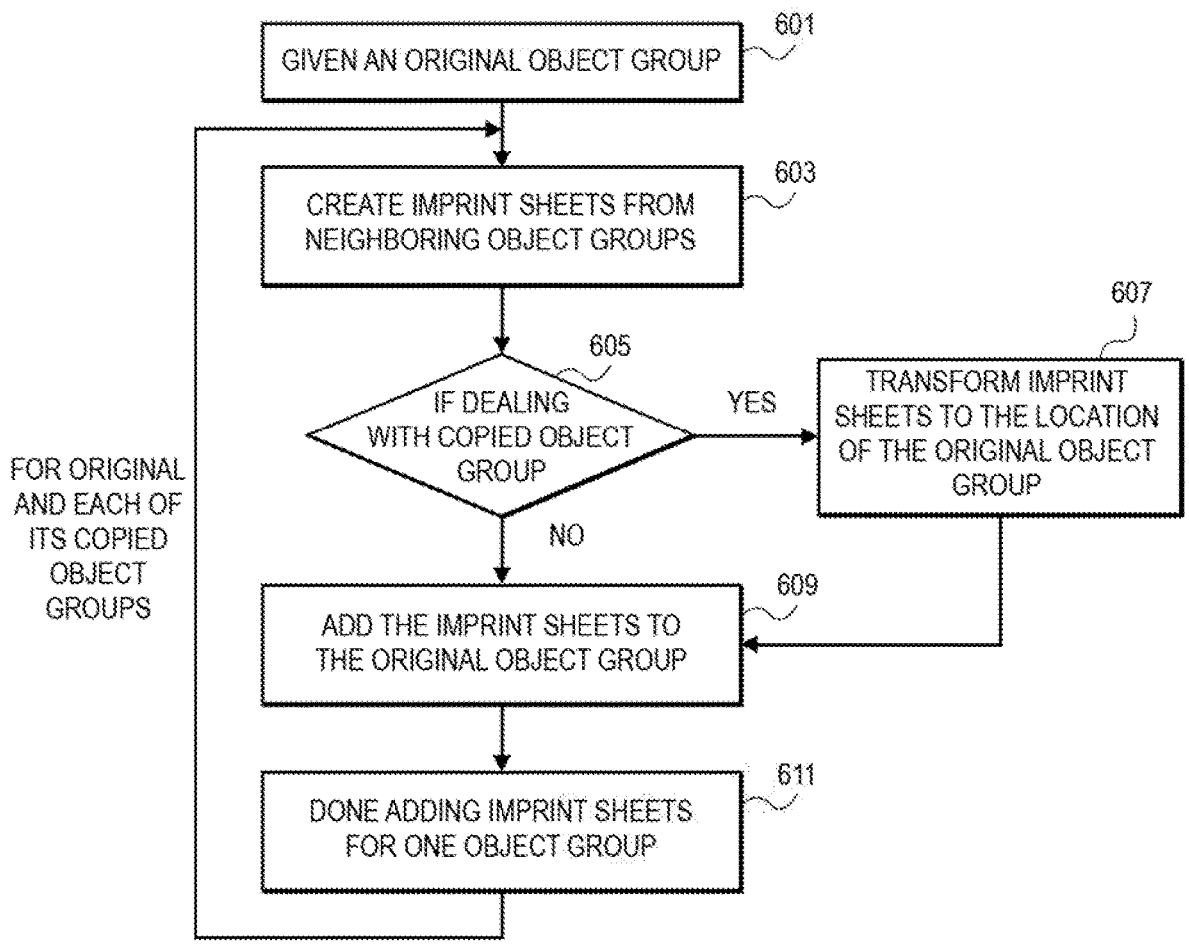
FIG. 6 is a flowchart which illustrates a method which can be used when there are copies of a domain such as a system which employs repeating elements each of which is a domain.

In one embodiment, multiple copies of an object group can be created and placed in different locations. A transformation, including both translation and rotation, can be defined between the original object group and each of its copied object groups. The mesh of the original object group can be transformed and used by the copied object groups, but it should first be made imprint conformal with all the neighbors of those copies. This in one embodiment means that, in addition to creating imprint sheets for the original, it is also necessary to create imprint sheets for the copies, and then to transform them back and include them when meshing the original object group. FIG. 6 shows a method in one embodiment which can be employed in the context of multiple copies of an object group that can be created and placed in different locations. The creation of multiple copies of an object group or domain can incur in structures where a particular object in the structure is repeated multiple times in different locations of the structure. A toothbrush with bristles is an example of a structure that includes multiple copies of a domain, where the domain is a bristle. Operation 601 of FIG. 6 starts with a given original object group. Then in operation 603, the system creates imprint sheets from neighboring object groups. In operation 605, the system determines whether it is dealing with a copied object group. If it is, processing proceeds to operation 607 in which the imprint sheets are transformed to the location of the original object group and then processing reverts to operation 609. If in operation 605 it is determined that a copy object group is not being dealt with, then processing proceeds to operation 609. In operation 609, imprint sheets are added to the original object group. Then in operation 611, the system determines whether it is done adding imprint sheets for one object group and then reverts back to operation 603 as shown in FIG. 6. Operations 603, 605, 607, 609, and 611 can be repeated for the original and each of its copied object groups as shown in FIG. 6.

Figure 7:
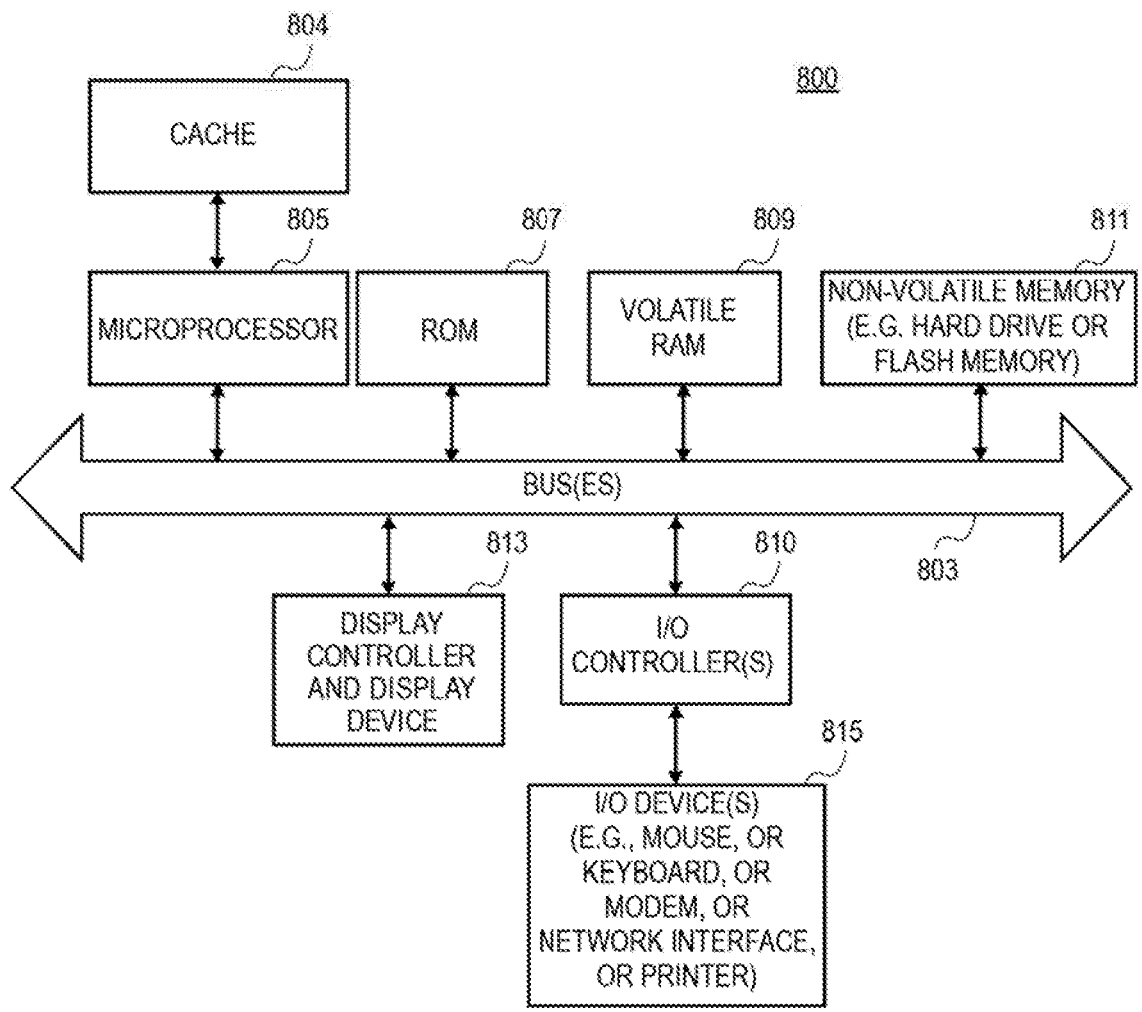
FIG. 7 is an example of a data processing system which can be used to perform one or more embodiments described herein.

FIG. 7 shows one example of a data processing system 800, which may be used with one embodiment. For example, the system 800 may be implemented to provide a system 101 as shown in FIG. 1 or a simulation tool 207 shown in FIG. 2. Note that while FIG. 7 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 7, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data)

even after power is removed from the system. Typically, the non-volatile memory 811 will also be a random access memory although this is not required. While FIG. 7 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable instructions which when executed by a data processing system cause the data processing system to perform a method comprising:
   determining a plurality of regions in a representation of a structure in a physical system, the plurality of regions including a first region and a second region;
   determining that a first face of the first region is adjacent to a second face of the second region at an interface between the first face and the second face;
   determining that the first face includes a representation of an applied first finite element method (FEM) boundary condition that is not present in the second face;
   adding, in response to determining that the first FEM boundary condition is not present in the second face, the first FEM boundary condition to the second face at a position on the second face corresponding to a position of the representation of the first FEM boundary condition on the first face, the adding comprising: generating an imprint sheet of the first FEM boundary condition corresponding to an overlapping of one or more of areas of the interface where the first face touches the second face, and adding the imprint sheet to the second face;

generating meshes for use in a finite element method used in a design process of the structure in the physical system, the generation of the meshes constrained on the second face by the first FEM boundary condition within the imprint sheet added to the second face, the generation of the meshes performed after the imprinting.

2. The non-transitory machine readable medium as in claim 1 wherein the method further comprises:

determining that the second face includes a representation of an applied second FEM boundary condition that is not present on the first face;

adding, in response to determining that the second FEM boundary condition is not present on the first face, the second FEM boundary condition to the first face at a position on the first face corresponding to a position of the representation of the second FEM boundary condition on the second face; and wherein the generation of meshes is constrained on the first face by the second FEM boundary condition added to the first face; and wherein the generation of meshes on the first face is performed independently of the generation of meshes on the second face.

3. The non-transitory machine readable medium as in claim 1 wherein the method further comprises:

computing one or more physical properties of the structure based on the generated meshes, wherein the one or more physical properties are computed based on solving electromagnetic fields on the generated meshes using boundary conditions, materials and excitations.

4. The non-transitory machine readable medium as in claim 1 wherein each region, in the plurality of regions, is a domain that is created as part of a domain decomposition method and wherein decomposition of domains is nonconformal and is used to formulate a solution.

5. The non-transitory machine readable medium as in claim 4 wherein the plurality of regions are determined either manually or automatically and the plurality of regions are non-overlapping and wherein the adding is done through imprint sheets that can be transformed when processing copied regions.

6. The non-transitory machine readable medium as in claim 1, wherein the representation of the structure is contained in a digital file that is used in a computer aided design process of the structure, and the computer aided design process produces an output that is used to fabricate the structure.

7. The non-transitory machine readable medium as in claim 1 wherein at the interface between the first face and the second face, the first face is in contact with the second face.

8. The non-transitory machine readable medium as in claim 1 wherein the first FEM boundary condition is one or more of: (1) a boundary condition obtained from properties of an object that is not meshed inside of the object and instead is represented by the first FEM boundary condition on the object's surface that is applied to the first face; (2) a boundary condition used to represent a physical feature or property or characteristic on the first face; or (3) boundary condition defined by a designer.

9. The non-transitory machine readable medium as in claim 1 wherein the first FEM boundary condition constrains the generation of the meshes by requiring that all mesh elements inside a perimeter of the representation of the applied first FEM boundary condition be wholly contained within the perimeter and no mesh element related to the first FEM boundary condition extends across the perimeter and no mesh element outside of the perimeter extends across the perimeter.

10. The non-transitory machine readable medium as in claim 9 wherein the first region includes a plurality of tetrahedral including a first tetrahedron that includes the first face as a surface of the first tetrahedron, and wherein the second region includes a plurality of tetrahedral including a second tetrahedron that includes the second face as a surface of the second tetrahedron, and wherein mesh elements on the first and second faces are triangles.

11. A machine implemented method comprising:

determining a plurality of regions in a representation of a structure in a physical system, the plurality of regions including a first region and a second region;

determining that a first face of the first region is adjacent to a second face of the second region at an interface between the first face and the second face;

determining that the first face includes a representation of an applied first finite element method (FEM) boundary condition that is not present in the second face;

adding, in response to determining that the first FEM boundary condition is not present in the second face, the first FEM boundary condition to the second face at a position on the second face corresponding to a position of the representation of the first FEM boundary condition on the first face, the adding comprising: generating an imprint sheet of the first FEM boundary condition corresponding to an overlapping of one or more areas of the interface where the first face touches the second face, and adding the imprint sheet to the second face;

generating meshes for use in a finite element method used in a design process of the structure in the physical system, the generation of the meshes constrained on the second face by the first FEM boundary condition within the imprint sheet added to the second face, the generation of the meshes performed after the imprinting.

12. The method as in claim 11 wherein the method further comprises:

determining that the second face includes a representation of an applied second FEM boundary condition that is not present on the first face;

adding, in response to determining that the second FEM boundary condition is not present on the first face, the second FEM boundary condition to the first face at a position on the first face corresponding to a position of the representation of the second FEM boundary condition on the second face; and wherein the generation of meshes is constrained on the first face by the second FEM boundary condition added to the first face; and wherein the generation of meshes on the first face is performed independently of the generation of meshes on the second face.

13. The method as in claim 11 wherein the method further comprises:

computing one or more physical properties of the structure based on the generated meshes, wherein the one or more physical properties are computed based on solving electromagnetic fields on the generated meshes using boundary conditions, materials and excitations.

14. The method as in claim 11 wherein each region, in the plurality of regions, is a domain that is created as part of a domain decomposition method and wherein decomposition of domains is nonconformal and is used to formulate a solution.

15. The method as in claim 14 wherein the plurality of regions are determined either manually or automatically and the plurality of regions are non-overlapping and wherein the adding is done through imprint sheets that can be transformed when processing copied regions.

16. The method as in claim 11, wherein the representation of the structure is contained in a digital file that is used in a computer aided design process of the structure, and the computer aided design process produces an output that is used to fabricate the structure.

17. The method as in claim 11 wherein at the interface between the first face and the second face, the first face is in contact with the second face.

18. The method as in claim 11 wherein the first FEM boundary condition is one or more of: (1) a boundary condition obtained from properties of an object that is not meshed inside of the object and instead is represented by the first FEM boundary condition on the object's surface that is applied to the first face; (2) a boundary condition used to represent a physical feature or property or characteristic on the first face; or (3) boundary condition designed by a designer.

19. The method as in claim 11 wherein the first FEM boundary condition constrains the generation of the meshes by requiring that all mesh elements inside a perimeter of the representation of the applied first FEM boundary condition be wholly contained within the perimeter and no mesh element related to the first FEM boundary condition extends across the perimeter and no mesh element outside of the perimeter extends across the perimeter.

20. The method as in claim 19 wherein the first region includes a plurality of tetrahedral including a first tetrahedron that includes the first face as a surface of the first tetrahedron, and wherein the second region includes a plurality of tetrahedra including a second tetrahedron that includes a second face as a surface of the second tetrahedron, and wherein mesh elements on the first and second faces are triangles.

21. The non-transitory machine readable medium as in claim 1 wherein the imprinting uses an imprint sheet that contains the first FEM boundary condition.

22. The non-transitory machine readable medium as in claim 9 wherein the imprinting uses an imprint sheet that contains the first FEM boundary condition.

23. The method as in claim 11 wherein the imprinting uses an imprint sheet that contains the first FEM boundary condition.

24. The method as in claim 19 wherein the imprinting uses an imprint sheet that contains the first FEM boundary condition.

* * * * *